United States Patent
Alkula et al.

(10) Patent No.: US 10,243,423 B2
(45) Date of Patent: Mar. 26, 2019

(54) BEARING BLOCK COVER, AXIAL FLUX MOTOR, ELEVATOR AND METHOD OF COMPENSATING MANUFACTURING TOLERANCES IN AN AXIAL FLUX MOTOR

(71) Applicant: KONE Corporation, Helsinki (FI)

(72) Inventors: Petri Alkula, Hämeenlinna (FI); Timo Avantola, Hämeenlinna (FI)

(73) Assignee: KONE CORPORATION, Helsinki (FI)

( * ) Notice: Subject to any disclaimer, the term of this patent is extended or adjusted under 35 U.S.C. 154(b) by 351 days.

(21) Appl. No.: 15/150,110

(22) Filed: May 9, 2016

(65) Prior Publication Data

US 2016/0254721 A1    Sep. 1, 2016

Related U.S. Application Data

(63) Continuation of application No. PCT/IB2013/060342, filed on Nov. 22, 2013.

(51) Int. Cl.
| | |
|---|---|
| *H02K 1/12* | (2006.01) |
| *H02K 1/27* | (2006.01) |
| *H02K 5/15* | (2006.01) |
| *H02K 5/173* | (2006.01) |
| *H02K 7/10* | (2006.01) |
| *H02K 7/102* | (2006.01) |

(52) U.S. Cl.
CPC ............. *H02K 5/15* (2013.01); *H02K 1/12* (2013.01); *H02K 1/2793* (2013.01); *H02K 5/1737* (2013.01); *H02K 7/102* (2013.01); *H02K 7/1008* (2013.01)

(58) Field of Classification Search
CPC .......... H02K 1/12; H02K 1/2793; H02K 5/15; H02K 5/1737; H02K 7/1008; H02K 7/102
USPC ........ 310/89, 90, 91, 87, 88, 67 R; 384/539, 384/480, 903; 277/574
See application file for complete search history.

(56) References Cited

U.S. PATENT DOCUMENTS

| | | | |
|---|---|---|---|
| 1,850,170 A | * 3/1932 | Delaval-Crow | .... F16C 33/7886 |
| | | | 384/487 |
| 2,118,027 A | * 5/1938 | Barish | ................. F16C 33/7886 |
| | | | 277/348 |

(Continued)

FOREIGN PATENT DOCUMENTS

| | | |
|---|---|---|
| DE | 198 39 640 A1 | 3/2000 |
| DE | 103 13 273 A1 | 10/2004 |

(Continued)

*Primary Examiner* — Bernard Rojas
*Assistant Examiner* — Ahmed Elnakib
(74) *Attorney, Agent, or Firm* — Birch, Stewart, Kolasch & Birch, LLP (57) ABSTRACT

An axial flux motor includes a first motor body part to which a stator including ferromagnetic stator cores and coils has been attached, a second motor body part attached to the first motor body part, a rotor including a number of magnets between the first and the second motor body parts, arranged against the stator in such a manner that an air gap remains between the rotor and the stator; and at least one bearing between the rotor and the stator. The axial flux motor further includes a bearing block cover attached to cover the bearing. A bearing block cover, elevator and a method of compensating manufacturing tolerances in an axial flux motor are also provided.

20 Claims, 5 Drawing Sheets

(56) References Cited

U.S. PATENT DOCUMENTS

| | | | | | |
|---|---|---|---|---|---|
| 2,253,904 | A | * | 8/1941 | Haug | F16J 15/164 |
| | | | | | 277/553 |
| 2,819,106 | A | * | 1/1958 | Voorhees | F16J 15/3252 |
| | | | | | 277/574 |
| 3,550,974 | A | * | 12/1970 | Kupchick | F16C 33/80 |
| | | | | | 384/480 |
| 4,147,367 | A | * | 4/1979 | Smith | F16J 15/3224 |
| | | | | | 277/505 |
| 4,373,759 | A | * | 2/1983 | Greener | B65G 39/09 |
| | | | | | 384/480 |
| 4,618,790 | A | * | 10/1986 | Kakuda | H02K 23/54 |
| | | | | | 310/268 |
| 5,596,235 | A | | 1/1997 | Yazaki et al. | |
| 6,183,136 | B1 | * | 2/2001 | Dingman | F16C 23/04 |
| | | | | | 384/202 |
| 7,011,452 | B2 | * | 3/2006 | Suzuki | F16C 33/783 |
| | | | | | 277/411 |
| 7,878,714 | B2 | * | 2/2011 | Arnault | F16C 19/163 |
| | | | | | 192/110 B |
| 2001/0030478 | A1 | * | 10/2001 | Drexlmaier | H02K 5/1672 |
| | | | | | 310/91 |
| 2005/0018935 | A1 | * | 1/2005 | Simpson | F16C 27/02 |
| | | | | | 384/204 |
| 2016/0273586 | A1 | * | 9/2016 | Arnault | F16C 33/586 |

FOREIGN PATENT DOCUMENTS

| | | |
|---|---|---|
| EP | 2 607 291 A1 | 6/2013 |
| FI | 20080544 A | 3/2010 |
| WO | WO 2011/080390 A1 | 7/2011 |
| WO | WO 2011/154614 A1 | 12/2011 |

\* cited by examiner

BEARING BLOCK COVER, AXIAL FLUX MOTOR, ELEVATOR AND METHOD OF COMPENSATING MANUFACTURING TOLERANCES IN AN AXIAL FLUX MOTOR

CROSS REFERENCE TO RELATED APPLICATIONS

This application is a Continuation of PCT International Application No. PCT/IB2013/060342, filed on Nov. 22, 2013, which is hereby expressly incorporated by reference into the present application.

FIELD OF THE INVENTION

The invention relates to bearing block covers, axial flux motors and elevators.

BACKGROUND ART

The principle of an axial flux motor is known from European patent application published under publication number EP 2 607 291 A1. Axial flux motors have proven to be a space-saving construction and especially well suited for use in elevator hoisting machines.

An axial flux motor that is to be used in an elevator hoisting machine needs to have a sufficiently robust bearing between the rotor and the stator. Even though the bearing may normally be replaceable with the apparatus and the method described in Finnish patent application FI 20080544 laid open 2010 Mar. 31, for example, it may still happen that the bearing gets broken before its scheduled maintenance. Other bearing block covers are known from U.S. Pat. No. 6,183,136 B1 and patent applications US 2005/018935 A1, DE 198 39 640 A1 and DE 103 13 273 A1.

When a bearing breaks, lubrication may escape from the bearing. Bearing lubrication entering movable parts of a machine is generally undesired. In the context of hoisting machines and elevators this may at least in theory be dangerous, since a hoisting machine normally comprises a number of brakes engaging a rotatable part of the axial flux motor. Lubrication on such a rotatable could easily make the brakes to slip.

The fitting of the bearing in an axial flux motor as disclosed in FI 020080544 has been realized by means of a recess machined in the rotor. In mechanical engineering, manufacturing tolerances of motor parts may be a significant cost factor. A larger manufacturing tolerance of the bearing causes also a the larger the risk of lubrication leaking from the bearing.

OBJECTIVE OF THE INVENTION

A first objective of the invention is to reduce the risk of lubrication espaping from the bearing block. This objective can be fulfilled with a bearing block cover according to claim 1 or 3 and with an axial flux motor according to claim 8.

A second objective of the invention is to reduce the theoretical risk of slipping brakes in an elevator. This objective can be fulfilled with an elevator according to claim 13.

A third objective of the invention is to allow larger manufacturing tolerances in the manufacturing of axial flux motors and bearings for the same while still being able to reliably prevent lubrication escaping from the bearing block in case of bearing damage.

The dependent claims describe advantageous aspects of the bearing block cover and of the axial flux motor.

ADVANTAGES OF THE INVENTION

A bearing block cover comprises an integrated lip sealing at the outer perimeter of the bearing block cover. The material of the lip sealing consists of or comprises elastomer and the bearing block cover further comprises a number of elastomer feeding channels through which material for the lip sealing has been inserted. With the integrated lip sealing, it can be better ensured that the sealing remains correctly in place.

Alternatively or in addition, the bearing block cover comprises a number of latch noses arranged radially around the bearing block cover and protruding from the perimeter of the bearing block cover, and a radial overhang that comprises an oblique part that sinks with increasing radial distance, and a lip sealing at the outer perimeter of the bearing block cover. The combined effect of the latch noses and of the radial overhang having an oblique part that sinks with increasing radial distance is that the bearing block may be used to compensate for manufacturing tolerances in an axial flux motor while still being able to prevent lubrication escaping from the bearing block in case of bearing damage. The radially arranged latch noses cause the bearing block cover to stick in place in the principle known as such from wedge action connectors. The oblique part of the radial overhang bends upwards when the bearing block cover is being installed and so the resulting elastic force pulls the latch noses upwards in order to secure the latching of the latch noses. The lip sealing improves the reliability of the bearing block cover so that if the bearing block to which the bearing block cover has been attached undergoes vibrations the sealing function can be improved.

Advantageously, the material of the lip sealing may consist of or comprise elastomer. In this manner, a strong enough sealing effect can be achieved over a long enough period of time.

If the lip sealing consists of or comprises elastomer, the bearing block cover may most preferably further comprise a number of elastomer feeding channels through which material for the lip sealing has been inserted. In this case, the bearing block cover preferably further comprises at least one positioning mark. The elastomer feeding channels enable manufacturing of the lip sealing to the bearing block cover by using injection molding. If the bearing block cover is manufactured by extruding or by injection molding (by using a first polymer or polymer blend), then the positioning marks help placing the bearing block cover blank in a correct orientation to the manufacturing tool for injection molding the second component (i.e. that of the lip sealing).

The bearing block cover may further comprise at least one pad (which most preferably is a piece of felt or comprises a piece of felt) arranged on the bottom side of the bearing block cover. The pad may be attached to the bearing block cover by a number of weldings that most preferably are ultrasonic weldings. In case of a lubrication leak due to bearing block breaking e.g. if a ball bearing bursts, the pad absorbs the lubrication before it can escape from the bearing block. Ultrasonic weldings can be carried out fast and in a cost-effective manner. The ultrasonic weldings are preferably carried out by using a tool that makes a plurality of the weldings at a time, most preferably the tool having the ultrasonic wedging emitters arranged around the circular diameter of the bearing block cover. In this manner, all weldings can be prepared at once. This saves time in the manufacturing process.

The bearing block cover may further comprise stiffening fins radially arranged around the bearing block cover. If the pad has been attached to the bearing block cover by weldings, the weldings are then most preferably located between the stiffening fins. The stiffening wings increase the vibration stability of the bearing block cover which may be installed in a rotating machine such as axial flux motor most preferably used in an elevator hoisting machine. The attachment of the pad by weldings can make the manufacturing process of the bearing block cover much cleaner since then the pad can be attached to the bearing block cover by applying separate adhesive. The welding locally melts the bearing block cover material to which the pad sticks.

The axial flux motor comprises a first motor body part to which a stator comprising ferromagnetic stator cores and coils has been attached, a second motor body part attached to the first motor body part, and a rotor comprising a number of magnets between the first and the second motor body parts, arranged against the stator in such a manner that an air gap remains between the rotor and the stator. Furthermore, the axial flux motor comprises at least one bearing between the rotor and the stator, and a bearing block cover according to the invention attached to cover the bearing. The interaction between the bearing block cove and the rotor or the bearing that is evoked by the latch noses and the radial overhang that comprises the oblique part reduces the probability of lubrication escaping from the axial flux motor in case of bearing damage.

Preferably, the axial flux motor is located in a hoisting machine comprising a traction sheave with rope grooves, located in such a manner that the rotor is rotatable in a vertical position. The traction sheave may be integrated to the rotor or connected to it via a rotating rotation transport unit. Because the traction sheave with rope grooves has to be accessible for the hoisting ropes to move the elevator car up and down in the elevator hoistway, the hoisting machine cannot be made completely closed. The bearing block cover helps to avoid the rotating parts to get soiled from lubrication escaping from the bearing in case of bearing damage.

If the axial flux motor further comprises at least one brake (preferably two brakes) configured to engage with a brake surface to brake the rotor, the bearing being separated from the brake surface and/or from the air gap by the bearing block cover, the bearing block cover helps to prevent lubrication escaping from the bearing in such a manner that it could soil the brake surface or soil the air gap in case of bearing damage.

Preferably, the rotor comprises at least one machined groove to which the machined bearing has been installed, and to which the latch nose engages. This enables an easy fastening of the bearing block cover to the axial flux motor. In this case, the radial overhang of the bearing block cover is preferably used to tension the latch nose against edge of the groove. The radial overhang having the oblique part can so used to reduce or to prevent shaking of the bearing block cover in a rotating machine that may result from manufacturing and assembling tolerances of the rotor and of the bearing.

With an elevator comprising a hoisting machine comprising an axial flux motor according to the invention, the theoretical risk of slipping brakes may be reduced.

LIST OF DRAWINGS

In the following, the bearing block cover, the axial flux motor and the elevator are described in more detail with reference to the attached drawings, of which.

Same reference numerals refer to same parts in all FIG.

DETAILED DESCRIPTION

Figure 1:
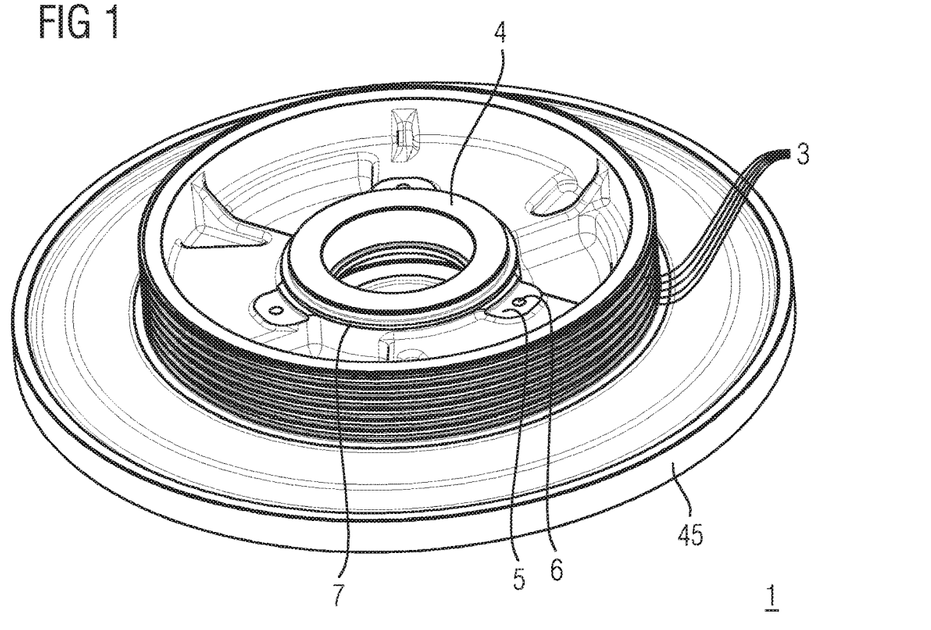
FIG. 1 illustrates the rotor of the axial flux motor as seen in perspective from the right side.

FIG. 1 shows rotor 1 of axial flux motor 30 as seen in perspective from the right side. In our exemplary embodiment, rotor 1 comprises rope grooves 3 for hoisting ropes that are used to move the elevator car. Instead of rope grooves 3, the rotor 1 may comprise gear-wheels or toothed portions for hoisting belts.

Rotor 1 also has a surface, a part of which functions as brake surface 45. Rotor 1 may also have bearing 7 fixed to the rotor 1 via bearing fixings 5 most preferably comprising fastening eyes 6. The bearing 7 may be covered with bearing block sealing 4.

Figure 2:
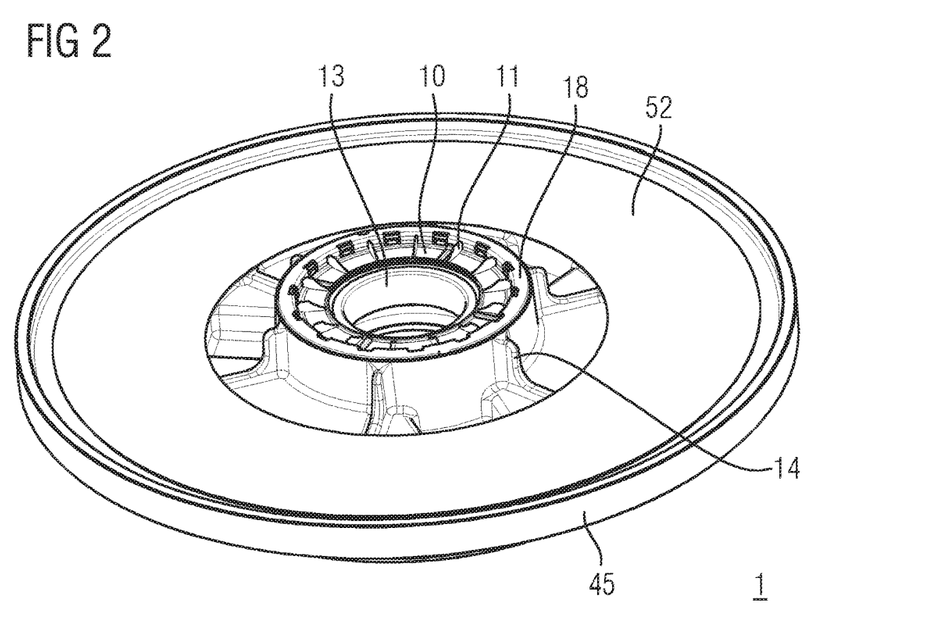
FIG. 2 illustrates the rotor of FIG. 1 as seen in perspective from the left side i.e. from the side that faces the stator.
Figure 3:
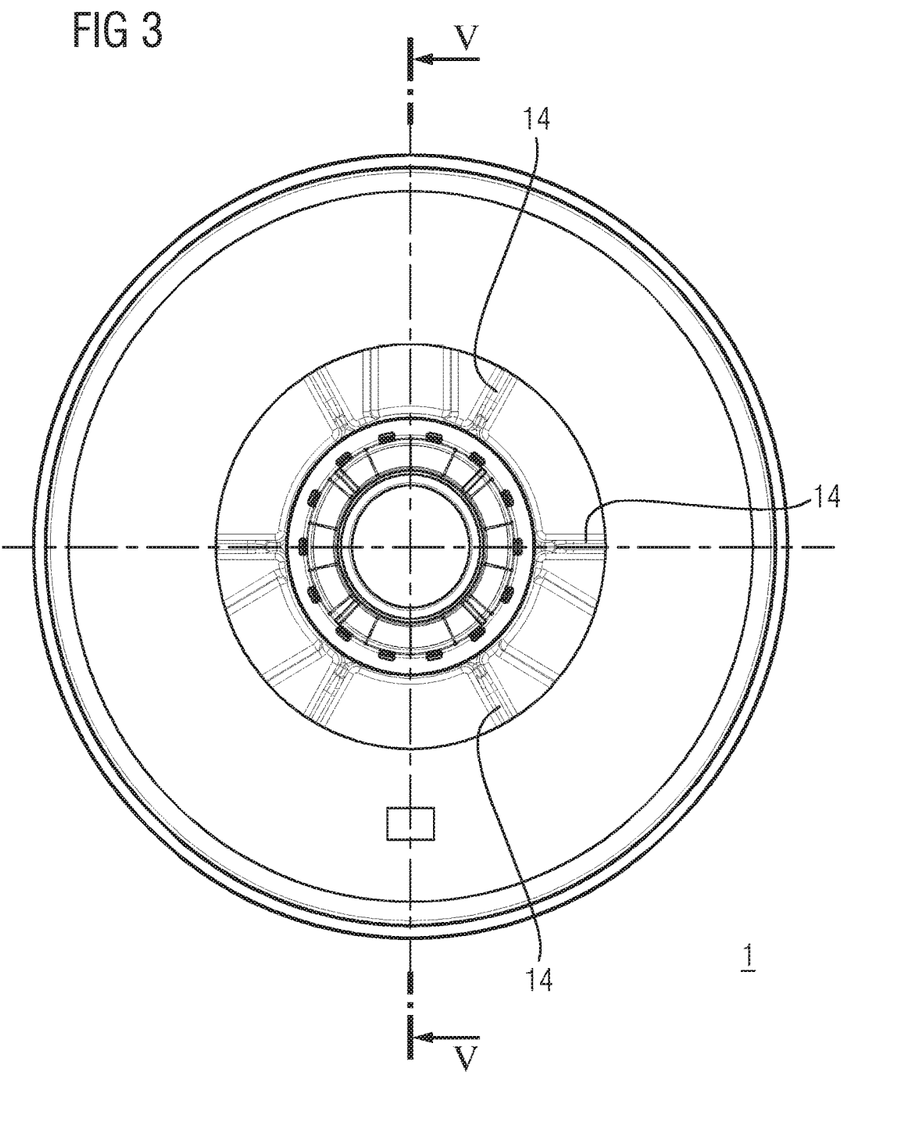
FIG. 3 illustrates the rotor in FIG. 1 as seen directly from the left side.
Figure 4:
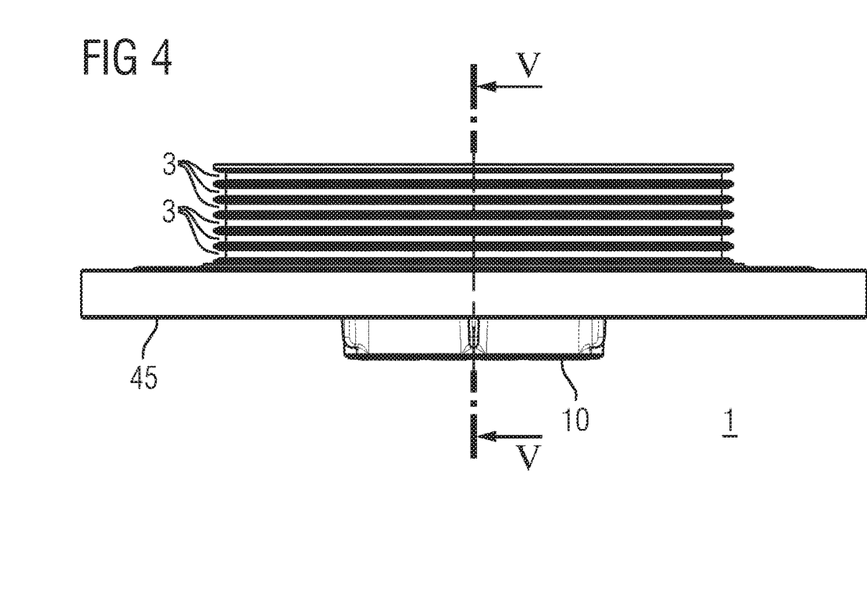
FIG. 4 illustrates the rotor in FIG. 1 as seen directly from top.
Figure 5:
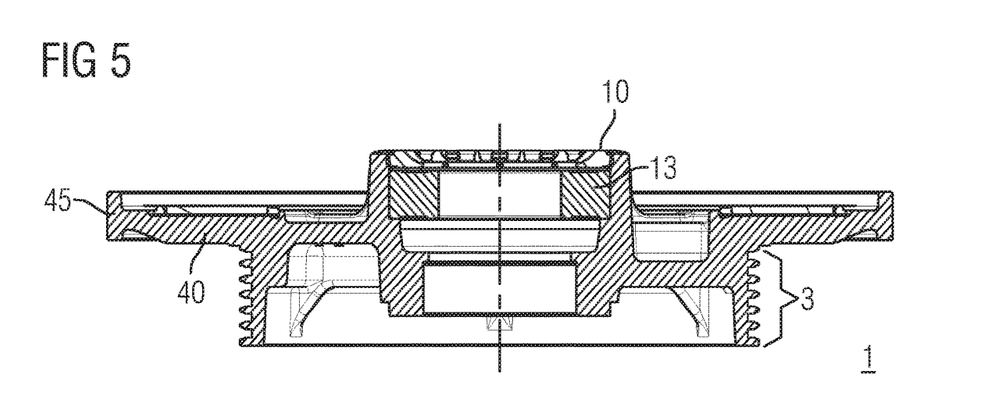
FIG. 5 is section V-V of the rotor as shown in FIG. 3.

FIG. 2 shows rotor 1 as seen in perspective from the left side i.e. from the side that faces the stator. Rotor 1 is shown directly from the left side in FIG. 3 and from top in FIG. 4. FIG. 5 is section V-V of the rotor as shown in FIG. 3.

Rotor 1 comprises traction sheave 40 in which the rope grooves 3 have been integrated. The manufacturing of rotor 1 takes place so that a plurality of magnets 50 are installed to traction sheave 40 by gluing them in a pattern with adhesive 51 (that most preferably is or comprises heat activated adhesive). The resulting package is then covered with a cover plate 52.

Then bearing 7 and bearing block sealing 4 are installed and fixed. Also bearing 13 with bearing block cover 10 is installed.

Figure 6:
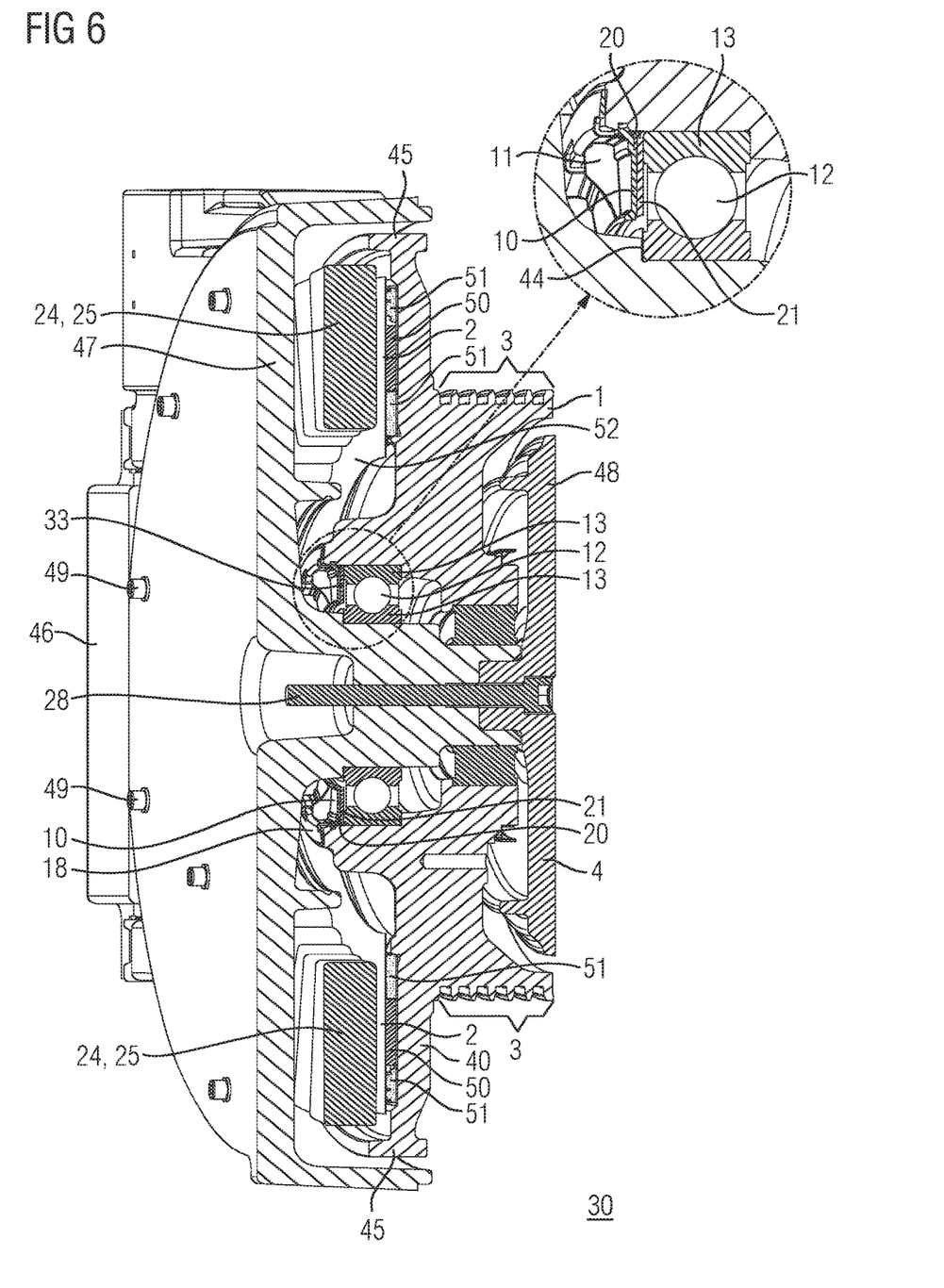
FIG. 6 is a section of the axial flux motor being part of a hoisting machine.

FIG. 6 is a section of the axial flux motor 30 being part of a hoisting machine. The axial flux motor 30 comprises a first part 47 of motor body, to which stator comprising a number of ferromagnetic stator cores 24 and a number of coils 25 are attached by fixing bolts 49.

The rotor 1 is placed with an assembly tool together with second part 48 of motor body on the stator so that air gap 2 (width of the air gap 2 has been denoted in FIG. 6 as d) remains, which optionally can be carried out by using spacers. The stator magnetically attracts the rotor 1 so that the assembly tool resists the magnetic attraction in order to avoid breaking of bearing 13. The first motor body part 47 and the second motor body part 48 are fixed together by threaded fixing bolt 28.

Axial flux motor 30 comprises a number, preferably two, of brakes 46 which preferably are normally-closed brakes (i.e. to open brake 46, it must be energized by feeding an electric current to a magnetizing coil, for example). The brake 46 engages with the brake surface 45 to brake the axial flux motor 30.

Figure 7:
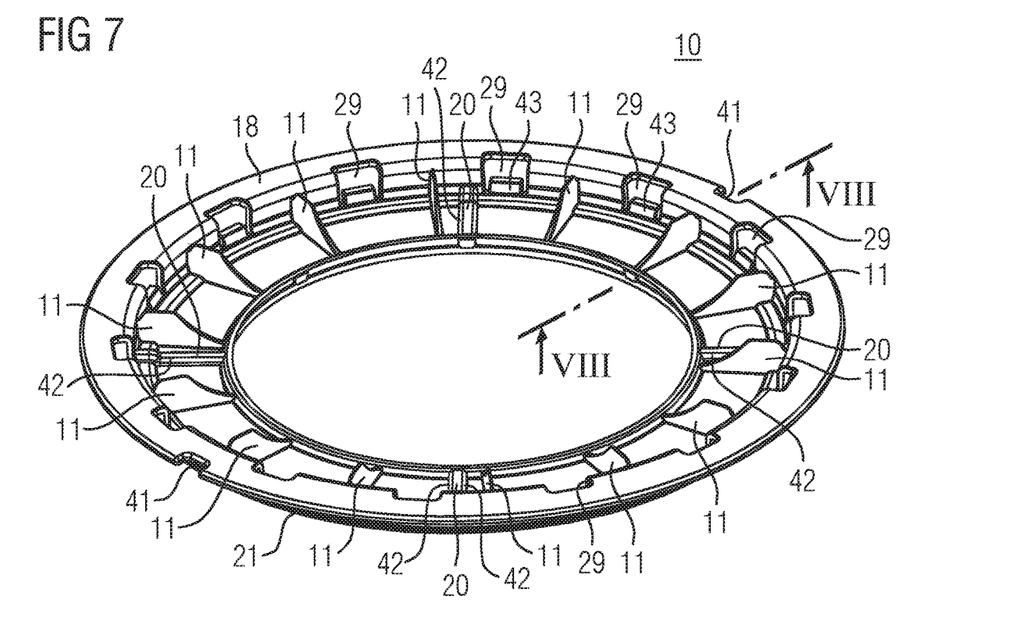
FIG. 7 illustrates the bearing block cover.

FIG. 7 illustrates bearing block cover 10 that comprises a number of latch noses 43 arranged radially around the bearing block cover 10 and protruding from the perimeter of the bearing block cover 10, a radial overhang 18 that comprises an oblique part that sinks with increasing radial distance (see also FIG. 8), and stiffening fins 11 radially arranged around the bearing block cover 10.

The bearing block cover 10 further comprises an integrated lip sealing 20 at the outer perimeter of the bearing block cover 10. The material of the lip sealing 20 consists of or comprises elastomer. The bearing block cover 10 further comprises a number of elastomer feeding channels 42 through which material for the lip sealing 20 has been inserted.

The bearing block cover 10 further comprises at least one positioning mark 41.

Figure 8:
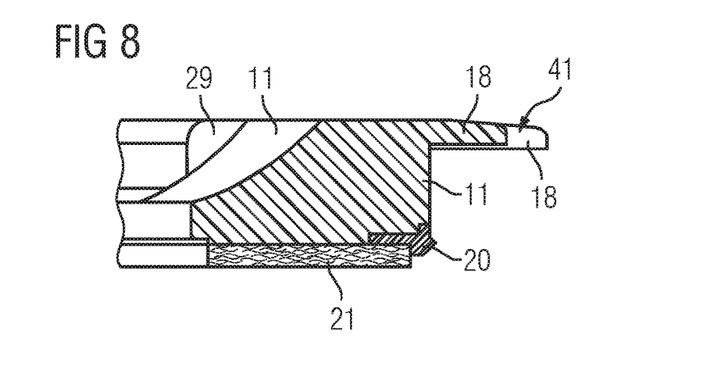
FIG. 8 is section VIII-VIII of the bearing block cover.

The bearing block cover also comprises at least one pad 21 arranged on the bottom side of the bearing block cover 10. Pad 21 is most preferably a piece of felt or comprises the same.

The pad 21 has been attached by to the bearing block cover 10 by a number of weldings that most preferably are ultrasonic weldings. The weldings may be located between the stiffening fins 11.

The bearing block cover 10 is intended to be attached to cover bearing 13. FIG. 6 indeed shows bearing block cover 10 in place covering bearing 13.

As can be seen in FIG. 6, the rotor 1 is rotatable in a vertical position. If bearing 13 breaks, lubrication 33 (oil or grease, for example) would start dropping towards air gap 2 from bearing 13 unless bearing block cover 10 is used. If then the rotor 1 starts to rotate, the escaped lubrication could be centrifuged to reach even the brake surface 45. The purpose of pad 21 in the bearing block cover 10 is to absorb any lubrication 33 before escaping. The purpose of the latching noses 32 is to engage with the edge of machined groove 44 in rotor 1 and so to latch the bearing block cover 10 in place. Since the machined bearing 13 has been mounted in groove 44, it must be understood that due to the manufacturing tolerances of the groove 44 and the bearing 13, the edge of groove 44 may be slightly closer to the air gap 2 or slightly further from the air gap 2. For this purpose, the oblique part of the overhang 18 that sinks with increasing radial distance acts as a spring which under tension causes a resilient (elastic) force and prevents the shaking of the bearing block cover 10 which in the long run could also cause shattering of the bearing block cover 10. In other words, bearing block cover 10 compensates for manufacturing tolerances of the rotor 1 and of the bearing 13 in such a manner that the radial overhang 18 of the bearing block cover 10 is used to tension the latch nose 43 against edge of the groove 44.

Brakes 46 are configured to engage with brake surface 45 to brake the rotor 1. The bearing 13 is separated from the brake surface 45 and/or from the air gap 2 by the bearing block cover.

In the method according to the invention, a bearing block cover 10 is fitted to cover a bearing 13 between the rotor 1 and the stator in such a manner that the latch noses 43 are bent inwards and the oblique part of the radial overhang 18 is lifted so that the resulting force caused by the bearing block cover 10 at least partly compensates manufacturing tolerances of the rotor 1 and the bearing 13.

The invention is not to be understood to be limited in the attached patent claims but must be understood to encompass all their legal equivalents. In particular, the spatial orientation of the axial flux motor 30 may be different so that the directional expression "right" when describing the structure of rotor 1 may be understood to be "outwards from axial flux motor" and "left" may be understood "inwards to axial flux motor".

LIST OF REFERENCE NUMERALS USED 1 rotor
2 air gap
3 rope groove
4 bearing block sealing
5 bearing fixing
6 fastening eye
7 bearing
10 bearing block cover
11 stiffening fin
12 ball bearing
13 bearing
14 fin
18 overhang
20 lip sealing
21 pad
24 ferromagnetic stator core
25 coil
28 center bolt
29 opening
30 axial flux motor
33 lubrication
40 traction sheave
41 positioning mark
42 elastomer feeding channel
43 latch nose
44 groove
45 brake surface
46 brake
47 motor body ($1^{st}$ part)
48 motor body ($2^{nd}$ part)
49 fixing bolt
50 magnet
51 adhesive
52 cover plate

The invention claimed is:

1. A bearing block cover, comprising:
   a number of latch noses arranged radially around the bearing block cover and protruding from the perimeter of the bearing block cover, wherein the latch noses are configured to engage with an edge of a machined groove of a traction sheave rotor;
   a radial overhang that comprises an oblique part that sinks with increasing radial distance, wherein the radial overhang is configured to tension the latch noses against the edge of the machined groove of the traction sheave rotor; and
   a lip sealing at an outer perimeter of the bearing block cover,
   wherein the radial overhang extends radially outside of the latch noses.

2. The bearing block cover according to claim 1, wherein the material of the lip sealing consists of or comprises elastomer and the bearing block cover further comprises a number of elastomer feeding channels through which material for the lip sealing has been inserted.

3. A bearing block cover, comprising:
   an integrated lip sealing at an outer perimeter of the bearing block cover; and
   a number of latch noses arranged radially around the bearing block cover and protruding from the perimeter of the bearing block cover, wherein the latch noses are configured to be tensioned to engage with an edge of a machined groove of a traction sheave rotor,
   wherein the material of the lip sealing consists of or comprises elastomer and the bearing block cover further comprises a number of elastomer feeding channels suitable for the insertion of lip sealing material and through which material for the lip sealing has been inserted.

4. The bearing block cover according to claim 2, wherein the bearing block cover further comprises at least one positioning mark.

5. The bearing block cover according to claim 1, further comprising at least one pad arranged on the bottom side of the bearing block cover.

6. The bearing block cover according to claim 5, wherein the pad has been attached to the bearing block cover by a number of weldings.

7. The bearing block cover according to claim 6, further comprising stiffening fins radially arranged around the bearing block cover, and wherein the weldings are located between the stiffening fins.

8. An axial flux motor comprising:
a first motor body part to which a stator comprising ferromagnetic stator cores and coils has been attached;
a second motor body part attached to the first motor body part;
a rotor comprising a number of magnets between the first and the second motor body parts, arranged against the stator in such a manner that an air gap remains between the rotor and the stator;
at least one bearing between the rotor and the stator; and
the bearing block cover according to claim 1 attached to cover the bearing.

9. The axial flux motor according to claim 8, wherein the motor is located in a hoisting machine comprising a traction sheave with rope grooves, located in such a manner that the rotor is rotatable in a vertical position.

10. The axial flux motor according to claim 8, further comprising at least one brake configured to engage with a brake surface to brake the rotor, the bearing being separated from the brake surface and/or from the air gap by the bearing block cover.

11. The axial flux motor according to claim 8, wherein the rotor comprises at least one machined groove to which the machined bearing has been installed, and to which the latch nose engages.

12. The axial flux motor according to claim 11, wherein the radial overhang of the bearing block cover is used to tension the latch nose against an edge of the groove.

13. An elevator comprising a hoisting machine comprising the axial flux motor according to claim 8.

14. A method of compensating manufacturing tolerances in the axial flux motor according to claim 8, said method comprising the step of:
fitting a bearing block cover to cover a bearing between the rotor and the stator in such a manner that the lock noses are bent inwards and the oblique part of the radial overhang is lifted so that the resulting force caused by the bearing block cover at least partly compensates manufacturing tolerances of the rotor and the bearing.

15. The bearing block cover according to claim 3, wherein the bearing block cover further comprises at least one positioning mark.

16. The bearing block cover according to claim 2, further comprising at least one pad arranged on the bottom side of the bearing block cover.

17. The bearing block cover according to claim 3, further comprising at least one pad arranged on the bottom side of the bearing block cover.

18. The bearing block cover according to claim 4, further comprising: at least one pad arranged on the bottom side of the bearing block cover.

19. An axial flux motor comprising:
a first motor body part to which a stator comprising ferromagnetic stator cores and coils has been attached;
a second motor body part attached to the first motor body part;
a rotor comprising a number of magnets between the first and the second motor body parts, arranged against the stator in such a manner that an air gap remains between the rotor and the stator;
at least one bearing between the rotor and the stator; and
the bearing block cover according to claim 2 attached to cover the bearing.

20. An axial flux motor comprising:
a first motor body part to which a stator comprising ferromagnetic stator cores and coils has been attached;
a second motor body part attached to the first motor body part;
a rotor comprising a number of magnets between the first and the second motor body parts, arranged against the stator in such a manner that an air gap remains between the rotor and the stator;
at least one bearing between the rotor and the stator; and
the bearing block cover according to claim 3 attached to cover the bearing.

* * * * *